US012580308B2

(12) United States Patent
Lebron Garcia et al.

(10) Patent No.: US 12,580,308 B2
(45) Date of Patent: Mar. 17, 2026

(54) BEAMFORMER RFIC CALIBRATION METHOD THEREFOR

(71) Applicant: BDCM A2 LLC, Dover, DE (US)

(72) Inventors: Rodrigo Manuel Lebron Garcia, Oceanside, CA (US); Andrew John Bonthron, Los Angeles, CA (US)

( * ) Notice: Subject to any disclaimer, the term of this patent is extended or adjusted under 35 U.S.C. 154(b) by 2 days.

(21) Appl. No.: 18/114,841

(22) Filed: Feb. 27, 2023

(65) Prior Publication Data

US 2023/0275347 A1      Aug. 31, 2023

Related U.S. Application Data

(60) Provisional application No. 63/314,159, filed on Feb. 25, 2022.

(51) Int. Cl.
| | |
|---|---|
| *H04B 17/11* | (2015.01) |
| *H01Q 3/26* | (2006.01) |
| *H04B 17/21* | (2015.01) |

(52) U.S. Cl.
CPC ............. *H01Q 3/267* (2013.01); *H04B 17/11* (2015.01); *H04B 17/21* (2015.01)

(58) Field of Classification Search
CPC ..... H04B 17/11; H04B 17/21; H01Q 3/26–30
See application file for complete search history.

(56) References Cited

U.S. PATENT DOCUMENTS

| | | | | |
|---|---|---|---|---|
| 9,614,279 | B2 * | 4/2017 | McDevitt | ............... H01Q 3/267 |
| 10,749,254 | B2 * | 8/2020 | Arnett | .................... H04B 17/14 |
| 11,177,567 | B2 * | 11/2021 | Khalil | .................... H04B 17/21 |
| 11,489,252 | B2 * | 11/2022 | Yetisir | ................. H01Q 9/0414 |
| 2024/0145912 | A1 * | 5/2024 | Brillant | ................. H01Q 3/267 |

* cited by examiner

*Primary Examiner* — Hasan Islam

(74) *Attorney, Agent, or Firm* — Dinsmore & Shohl LLP

(57) ABSTRACT

A method for calibration of a phased array antenna system with reduced set of data points for optimized calibration. A system that identifies a constant gain circle and constant phase lines from measured results and selects a set of data points therein for testing.

12 Claims, 6 Drawing Sheets

-- PRIOR ART --

410

MEASURED

400

<I,Q> complex vectors

402

IDEAL

PHASE SHIFTS

404

BEAMFORMER RFIC CALIBRATION METHOD THEREFOR

CROSS-REFERENCE TO RELATED APPLICATIONS

This application claims priority from U.S. Provisional Application No. 63/314,159, titled "Beamformer RFIC Calibration Method Therefor," filed on Feb. 25, 2022, of which is incorporated by reference herein.

BACKGROUND

Analog phased array antenna systems have advantages in various applications, such as RADAR; however, they rely on radio frequency integrated circuit (RFIC) beamformers to correctly apply phase shifts and amplitude configuration to their antenna elements, and if the RFIC beamformers are not correctly excited the performance of the phased array will deteriorate. Proper beamforming is specified in each application, and specifically in radar applications using phased array antennas. Incorrect excitation in RADAR results in transmission errors and may alter the information extracted from received signals, such as range to target, angle of arrival, velocity of detected object, and so forth. Calibration techniques assist in correction of RFIC beamforming.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Figure 1:
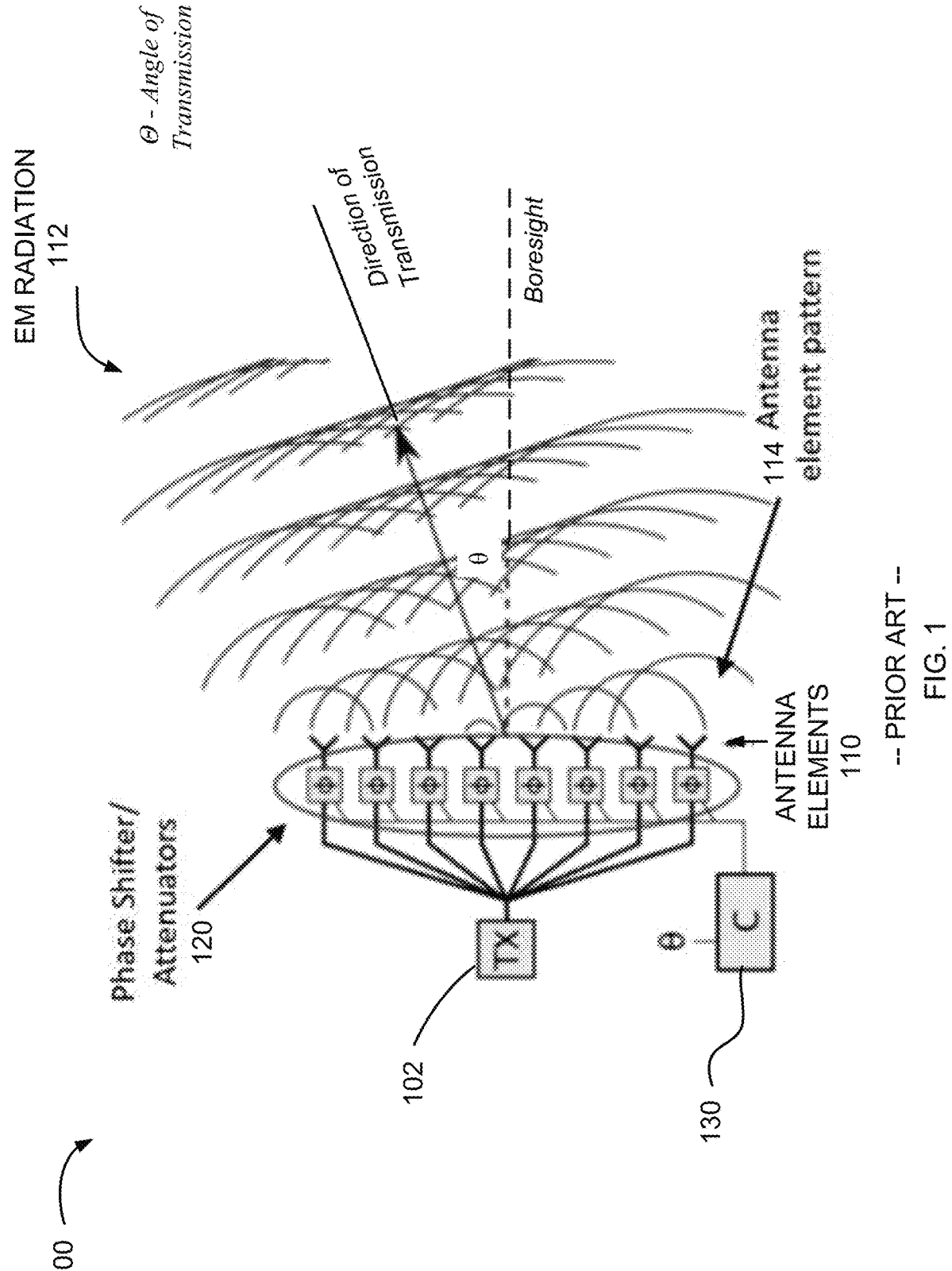
FIG. 1 illustrates a prior art phased array antenna system.

Operation of systems, such as radar system, specify the speed of beam steering and scanning of an area and use phased array antennas due to their capabilities in meeting such specifications. Phased array antenna systems include a combination of radiating elements, antennas, controlled to form, direct, and steer electromagnetic radiation, referred to as over the air transmissions or beams. Beam steering and sidelobe level controls the phase and amplitude, respectively, of the excitation of the radiating elements. The phased array antenna system controls the direction and shape of the beam by changing the phase of signals fed into antenna elements. In analog phased array systems, the phase and amplitude control of each radiating element is usually realized by implementing a RFIC beamformer. In a radar system, the phased array antenna system transmits beams and receives return beams that indicate reflection from interaction with objects, referred to as targets. The system combines the received signals from individual antenna elements, and the strength of this signal determines target detection. The antenna pattern and beam forming of a phased array antenna system are more configurable than an individual antenna element. The peak sensitivity of the collective antenna elements results from phase control and not mechanical steering.

At the core of an analog array is the RFIC beamformer, which electronically varies phase shifters switching the beam position at the speed of the phase shifting elements. For these and a variety of other reasons, analog phased array antennas are used more and more in both communication and sensing. While the phased array antenna system has a variety of advantages, the quality of its performance is dependent on the proper configuration of its RFIC beamformer. As the beam from the antenna array is based on proper alignment of the individual elements, this results in transmission errors. Sidelobe level (SLL) is a measure considered in defining proper performance as it is susceptible to misalignments. Proper operation requires calibration of the RFIC beamformer to identify and compensate for the misalignment. Calibration is the procedure to measure the excitation voltages and currents of a RFIC beamformer, which is then used to adjust the phase shift and attenuation components and control to achieve proper operation.

The ultimate goal of the calibration is to ensure proper beamforming. RFIC beamformers have different operation mechanisms to control the phase shifting and attenuation capabilities over its channels. In this document the focus is to define a procedure on how to calibrate RFIC beamformers employing IQ type of phase shifters and voltage gain adjustable attenuation controls.

To properly excite a RFIC beamformer, an example calibration encompasses to collect and process microwave signal data to generate compensation gains at a radio frequency integrated circuit (RFIC) controller. As used throughout this document, transmission signals may be referred to as in-phase (I) and quadrature (Q), indicating their phase relationship to each other.

In another example, a calibration method builds a calibration circle and identifies calibration elements of an antenna array to build a calibration lookup table (LUT). In one example, this method converts I and Q signals to a circular coordinate system to form a calibration circle, and then finds a center of the calibration circle from a bias voltage. The method selects a subset of points from the total set of (I,Q) combination points for testing. These points are cardinal states (I,Q) where the behavior of gain and phase are evaluated in isolation from the other. The cardinal states are then converted to corresponding phase shifter (PS) values, i.e., voltage values that achieve the cardinal states. The method further evaluates values for variable gain amplifier (VGA) to increase the amplitude and thereby increase the circle. The method determines a radius of the calibration circle based on VGA values to obtain an optimum radius for the application. The resultant final calibration circle represents the beamformer channel capability defined by a subset of x PS values and subset of y VGA values. Specific conditions may be selected from the calibration circle and sets of values, such as to select 25 dB at a separation of ½ dB.

The present invention provides methods for calibration of a RFIC beamformer to be used on a phased array. As illustrated in FIG. 1, a prior art phased array antenna system 100 is a transmit (Tx) antenna and receives transmission signals from a transmit controller 102, or transceiver, coupled to a set of phase shifters and attenuators 120 for providing an electromagnetic signal to antenna elements 110. The set of phase shifters and attenuators are lumped into a RFIC beamformer. Each of the elements 120 generates an antenna element pattern, such as pattern 114. The antenna patterns 114 form a transmission beam in a given direction. A controller 130 Control of the phase shifters 120 directs the transmission signal, as illustrated by direction of transmission in FIG. 1 that forms an angle of transmission θ between a boresight direction. Combination of the transmission signals 112 form a transmission beam. To change the direction of the transmission beam, beamsteering, a controller 130 changes input to the phase shifters 120. In a phased shift antenna, control of the phase of each of the antenna elements, radiating elements, controls behavior of the antenna system. The controller 130 is flexible and may control each antenna element 110 to have a different phase shift, and thus steer the radiation or transmission beam. Phased array antennas provide high antenna gain and fast switching times. A challenge in operation of a phased array antenna is misalignment of the individual radiation patterns.

Figure 2:
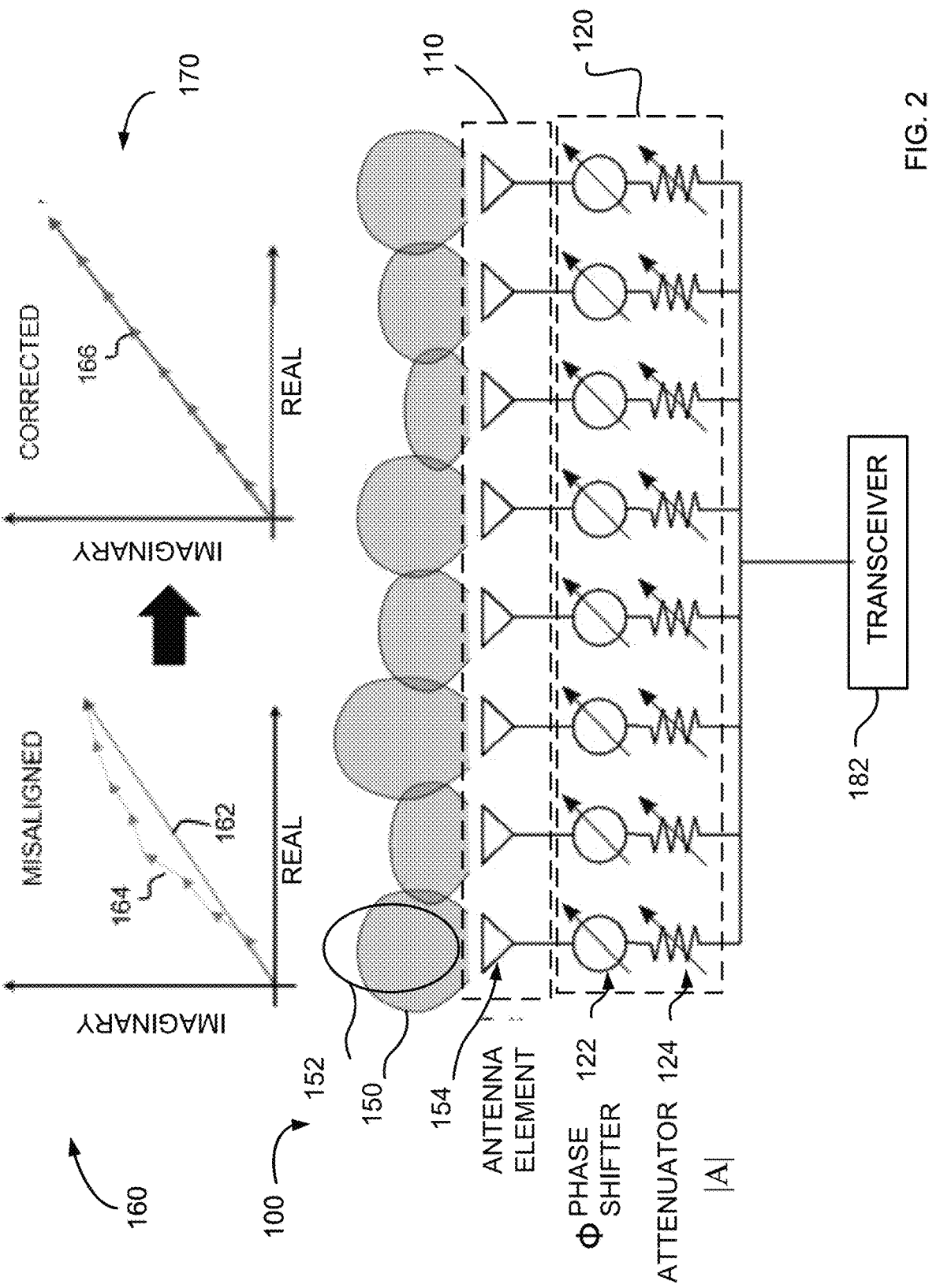
FIG. 2 illustrates an example of misalignment of beams including a plot of misalignment and a plot of corrected behavior.

FIG. 2 illustrates the antenna system 100 having phase shift module 120 and antenna elements 110, where the phase shift module 120 includes a path to each of the antenna elements 110 having an attenuator 124 and a phase shifter 122. This is the beamformer portion of the antenna system 100. The signals propagating on the transmission lines through the phase shift module 120 components to the radiating elements 110, exciting the radiating elements 110 and each radiation has an amplitude and phase. Adjusting the amplitude and phase form the shape of the transmission beam and act to direct the combined array pattern in a specific direction. A phased array antenna's peak directivity which is a measure of the power density of the antenna in its direction of maximum radiation. Phased arrays suffer from inherent excitation errors or misalignments. Phase errors, amplitude errors and directivity errors lead to degradation of the array pattern characteristics and thus the behavior of the antenna system 100. These errors are referred to as perturbations and misalignments and may result in increased unwanted artifacts, such as side lobe level (SLL), reduced peak directivity, and so forth. For example, misalignment of a phased array antenna system in a radar module would degrade the operation of the radar and may result in false positives or false negatives.

FIG. 2 illustrates perturbations in the transmission beams. For example, the controlled beam of antenna element 150 is controlled to have a beamform 152, but the actual beam is misaligned and is represented by beamform 154. Each radiating element 110 may have an individually different misalignment, and the misalignments result in changes to the combined beamforms. These perturbations and misalignments are seen in the amplitude and phase of each radiating element and the resultant antenna patterns. The changes are due to the hardware and integrated circuit, as there may be incorrect configuration of the RFIC phase shifter and/or attenuators, electrical coupling of transmission lines, slight deviations in operation of the phase shift modules 120, and environmental effects.

It is to be noted that the beamformer 120 receives signals from transceiver 182 and configures the phase and attenuation of each radiating element 154 of antenna system 100. The phase shift Φ controls beam position, and the amplitude |A| controls side lobe level of a phased array antenna. Application of phase shifts to each antenna element 154 steers the beam 150 without mechanical steering. To achieve the desired performance, the beamformer 180 control configures for a desired $<\Phi_D, |A_D|>$, where subscript D refers to the desired value.

Calibration is the procedure to measure the effects over phase shifting and attenuation of configuring the excitation voltages and currents of a RFIC beamformer. Calibration results provide information to map the input I,Q, and VGA configuration parameters of the RFIC to an output of phase shift and amplitude $<\Phi_D, |A_D|>$. In the plots of FIG. 2, the Real and Imaginary portions of the transmission pattern are plotted with the misalignment and as corrected. As illustrated in plot 160, the desired response is line 162, while the actual misaligned response is the curve 164. In plot 170, the transmission is corrected as line 166 and mirrors line 162. The accuracy of a wireless system, and a radar system in particular, is sensitive to the effectiveness, consistency, and precision of the calibration system.

Figure 3:
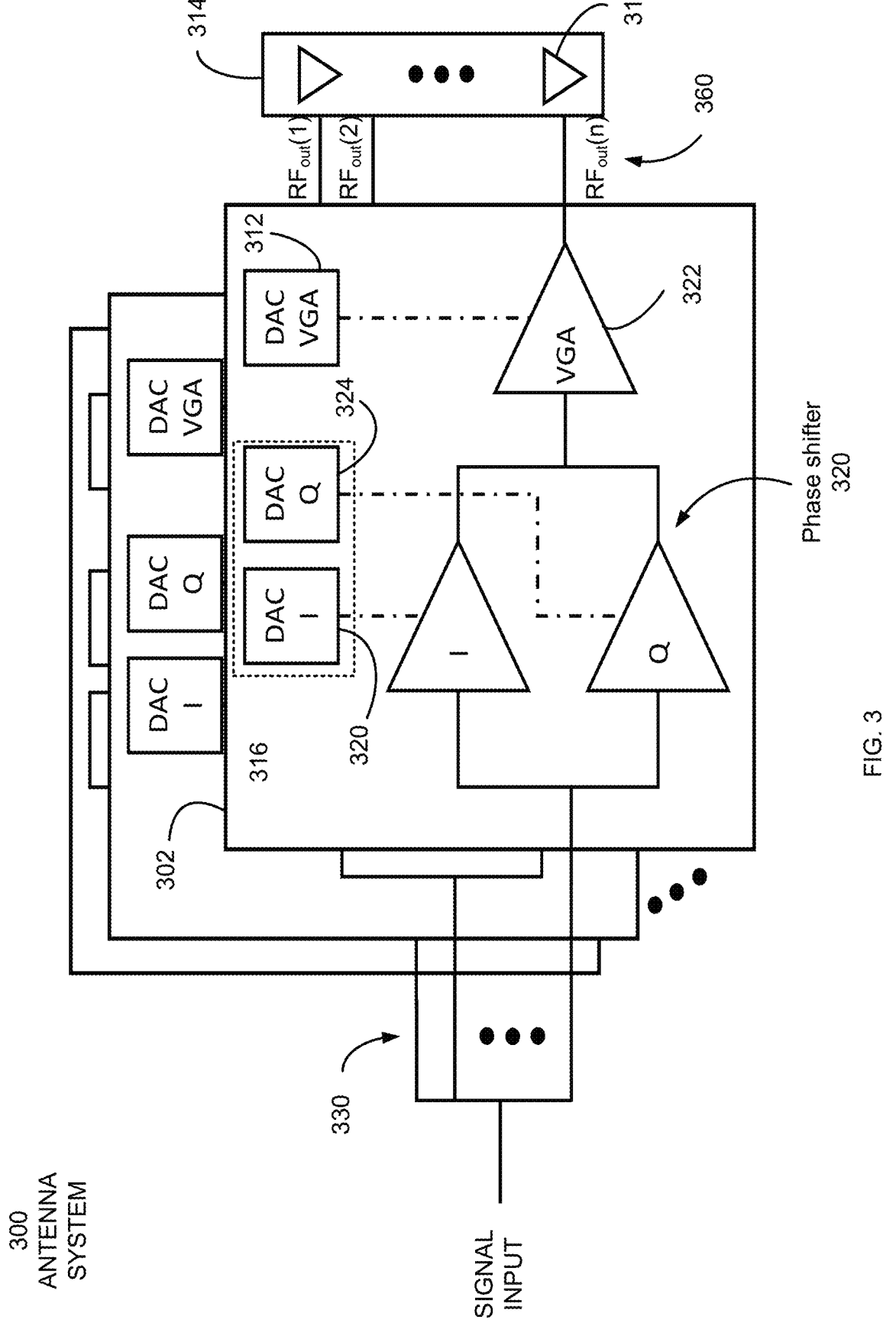
FIG. 3 illustrates an antenna system, according to example embodiments of the present inventions and subject technology.

The phase shifter calibration testing is crafted according to the type of phase shifter module and components implemented. The phase shifters are implemented as RFICs, which are beamformer circuits or chips. In the detailed examples herein, the phase shifters perform IQ modulation with multiple 8-bit digital-to-analog converters (DACs). FIG. 3 illustrates an RFIC beamformer 302 having DACs 316 and the resultant vector 360 from combinations of <I,Q> indicated as:

$$[RF_{out(1)}, RF_{out(2)}, \ldots RF_{out(n)}],$$

where n represents the number of transmission paths to antenna elements in antenna array 314, such as element 310. The quadrature or IQ modulation ideally results in a square shaped plot of complex vectors (see FIG. 4) to achieve desired results $<I_D, Q_D,>$ corresponding to each desired phase shift OD. In actual operation, I and Q influence each other causing distortions from an ideal square shape. Compensation is to determine the differences to determine a compensation plan.

The phase shifter calibration process links the control signals, such as <I,Q> voltages, to the phase shift values Φ. The calibration control signals are a set of values to a realize a test phase and test amplitude excitation per channel. Calibration focuses on these RFICs, defining the voltages for application to each channel, to obtain a desired phase and amplitude signal. Calibration process involves application of a set of voltages to the beamformer RFIC, such as phase shifter, to cycle the phase shift and attenuation voltages of each channel. On each cycle, the process measures insertion loss between the tested channel port of the RFIC and the beamformer port. In this stage the RFICs are isolated and based on this measured data and information, the calibration process then determines the inputs to each RFIC to obtain a desired phase and amplitude signal output of RFIC.

FIG. 3 illustrates an antenna system 300 having beamforming capability with RFIC beamformer 302, having phase shifter 320, VGA 322, for controlling transmission signals radiating from antenna array 314. The RFIC beamformer 302 includes multiple transmission channels 330 coupled to antenna elements 310 within antenna array 314, wherein each transmission path includes a RFIC beamformer, such as RFIC beamformer 302. In this example, the RFIC beamformer 302 is illustrated in a schematic format with a simplified transmit (Tx) module for purposes of explanation and clarity of understanding; however, an antenna system may include receive (Rx) or a combination of both (Tx/Rx). Each channel of an antenna system is defined by a transmission path from a transceiver (not shown) to an antenna element, such as antenna element 310.

Along each transmission path 330 corresponding to a channel are phase shift components, which in this example are analog components, and a variable gain amplifier (VGA). The output of each channel is a signal $RF_{out}$ that is input to an antenna element, such as signal $RF_{out(n)}$ to antenna element 310. There is one input to each channel. In some embodiments, the <I,Q> signals are defined by the DAC module 316, resulting in 256 states or data points for DAC 320 and 256 states for DAC 324. The <I,Q> performance results in (256*256) which is 65,536 states. The VGA module 322 is actuated by voltage control realized by an 8-bit DAC 312.

Figure 4:
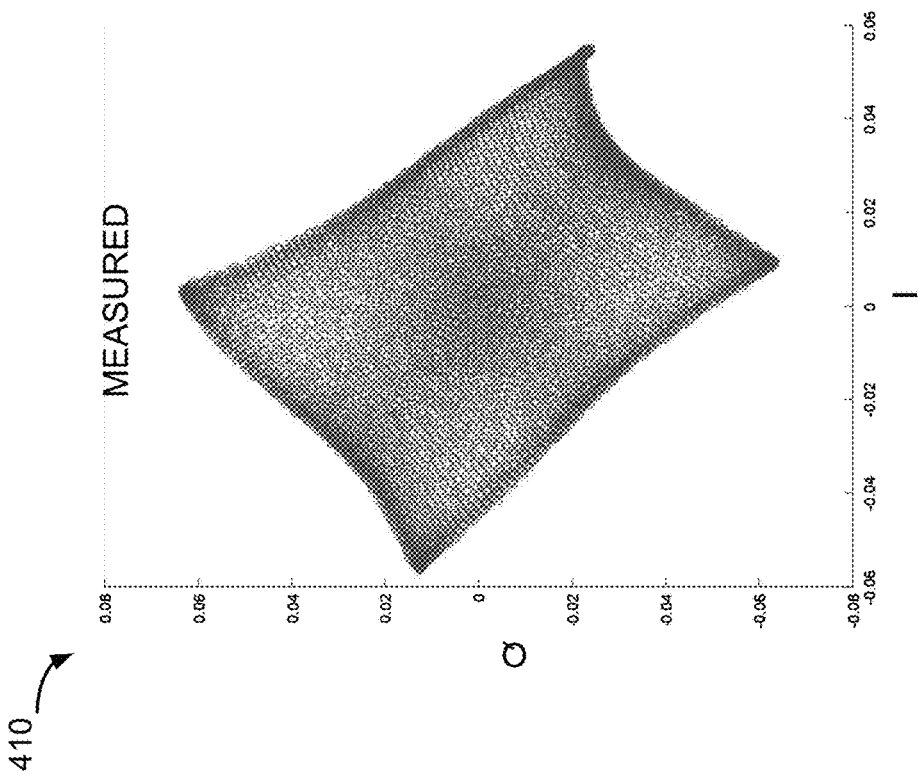
FIG. 4 illustrates ideal and measured plots of <I,Q> states, according to example embodiments of the present inventions and subject technology.
Figure 4:
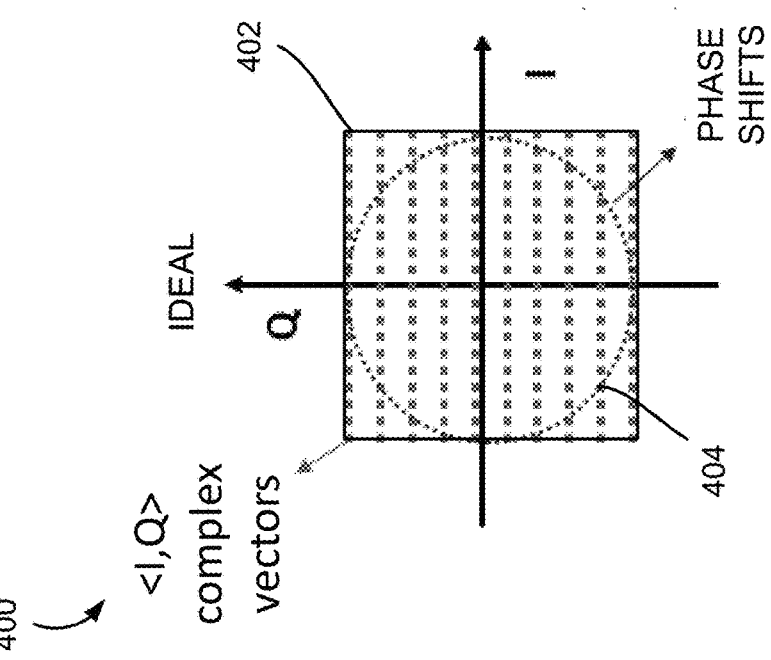

FIG. 4 illustrates the set of potential output results from an RFIC beamformer system, such as illustrated for antenna system 300 of FIG. 3, where the DAC module 316 generates 256 states (<I,Q> complex vectors). Plot 400 illustrates an expected set of states 402, having a square shape. A constant gain circle 404 of varying phase is overlaid on plot 402. The plot 400 is an ideal response. In contrast, plot 410 illustrates a measured result, which is distorted from the expected square shape 402 from distortions arising due to coupling of gain and phase or other physical mechanism. The quadrature portion, Q, of the complex weight may yield more power than the in-phase portion, I, of the signal, causing a distorted or skewed rectangular shape that is not a square. Signals I and Q may saturate resulting in densely populated edges. Calibration processes determine compensation for such distortions and imperfections in phase control. In these processes a portion of the 256 bits may be restricted to avoid saturation.

Calibration ultimately will define a mapping, or LUT, having sets of control parameters <I,Q,VGA> to obtain a corresponding pairing of phase shift and attenuation <Φ, |A|> as output, $RF_{out}$. An amplifier, such as a VGA 322, controls output signal amplitude and controller, such as the 8-bit DAC VGA 312, results in 256 states for control of VGA operation. While the desired amplitude |A| behavior is a linear or log function of the <VGA> state, in the illustrated examples, some of the 256 bits are restricted to avoid saturation resulting in a non-linear behavior. This is due to the VGA DAC 312 modification of amplitude and phase shifts, and thus the relation between <VGA> and |A| is not linear.

Figure 5:
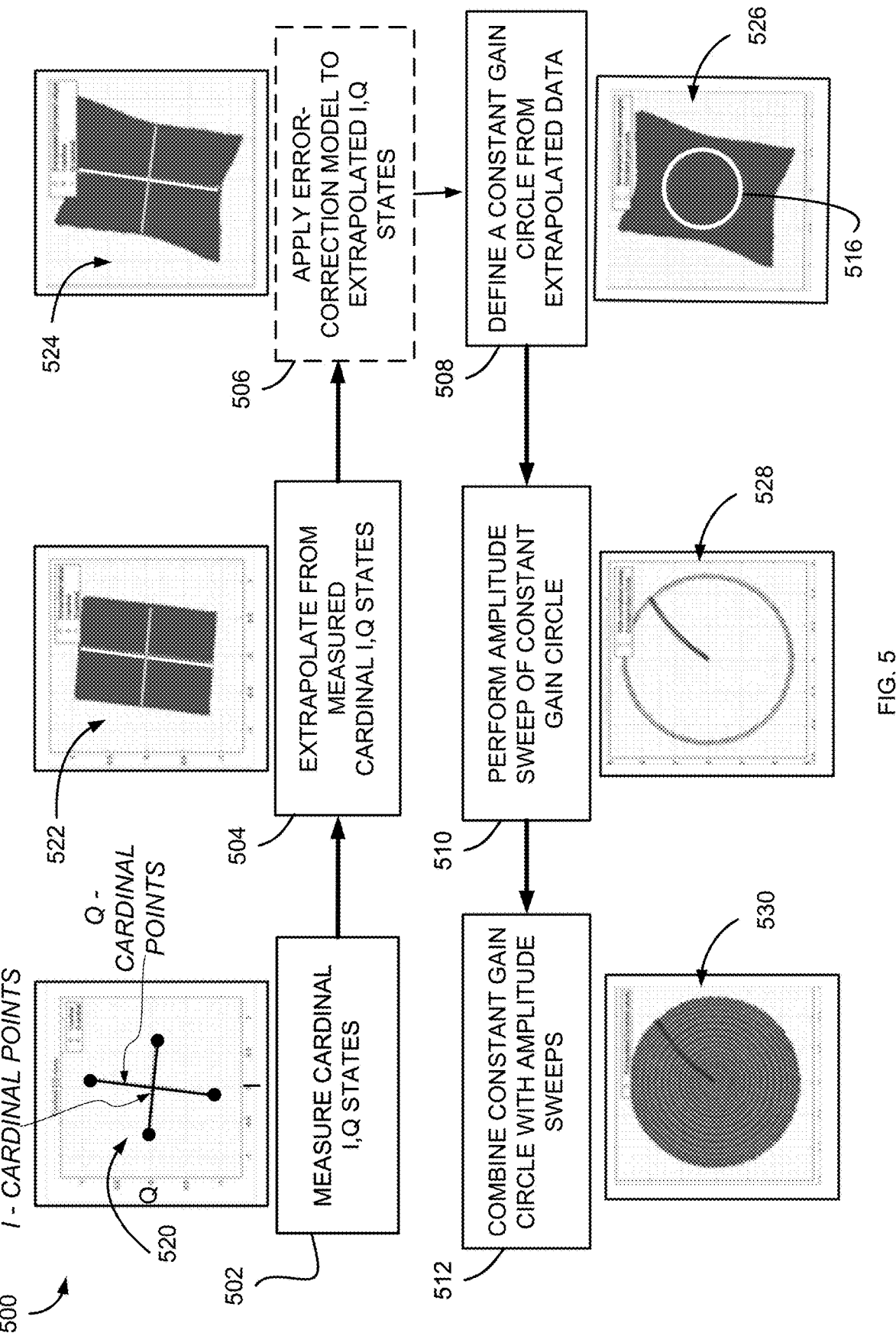
FIG. 5 illustrates a calibration method, according to example embodiments of the present inventions and subject technology.

In the example embodiments, a process of selecting points to achieve a desired result from the measured results is obtained using extrapolation. FIG. 5 illustrates an example extrapolation process 500 from the <I,Q> coordinate outputs of the phased array antenna system. At each stage or step, an illustrative example is provided. The process extracts an approximately rectangular shape from identification of cardinal states from the measured data which allows extrapolation of all combination of points defining complex vectors W(I,Q) 522 therein using:

$$W(I,Q,VGA\_ref)=W(I,Q=0V,VGA\_ref)+W(I=0V,Q,VGA\_ref)-W(0,Q=0V,VGA\_ref).$$

The term ref added to a magnitude indicates a non-off reference value that has been arbitrarily selected out of many to represent the corresponding magnitude. Performing error calculation from a prior compensation process, as:

$$W'(I,Q,VGA\_ref)=Error(I,Q,VGA\_ref)W(I,Q,VGA\_ref).$$

The Error(I,Q,VGA ref) term is a compensation of inherent unwanted model deviations that exhibit in an actual manufactured chip. The compensation term is calculated as the ratio between a measured performance from a representative chip to the expected performance. From compensated complex vectors W'(I,Q) a constant gain circle $W_{CG(phs,amp=0)}$ is selected as:

$$W\_CG(phs,amp=0)=\arg_{i,q}\min(|W'(I,Q,VGA\_ref\_-W\_ideal(phs,amp=0)|).$$

W_Ideal(phs,amp=0) represents an ideal phase shift performance, which is a unit circle consisting of points located at desired phase shift angles $\Phi_D$.

Afterwards, amplitude data is extrapolated from the constant gain circle, from which other constant gain circles are also extrapolated, as:

$$W\_CG(phs,amp)=[W\_CG(phs,amp=0)-W\_Bias][W(I\_ref,Q\_ref,VGA)-W\_Bias]$$

W_Bias is the measured complex bias resultant by configuring the I,Q, and VGA DACs 312 to their OFF states. the W_CG(phs,amp) is a dense cloud of complex vectors from which suitable states may be selected.

Selection of the suitable states considers a phase versus amplitude grid.

$$W\_LUT(phs',amp')=\arg_{phs,amp}\min(|W\_CG(phs,amp)-W\_Ideal(phs,amp)|)$$

Figure 6:
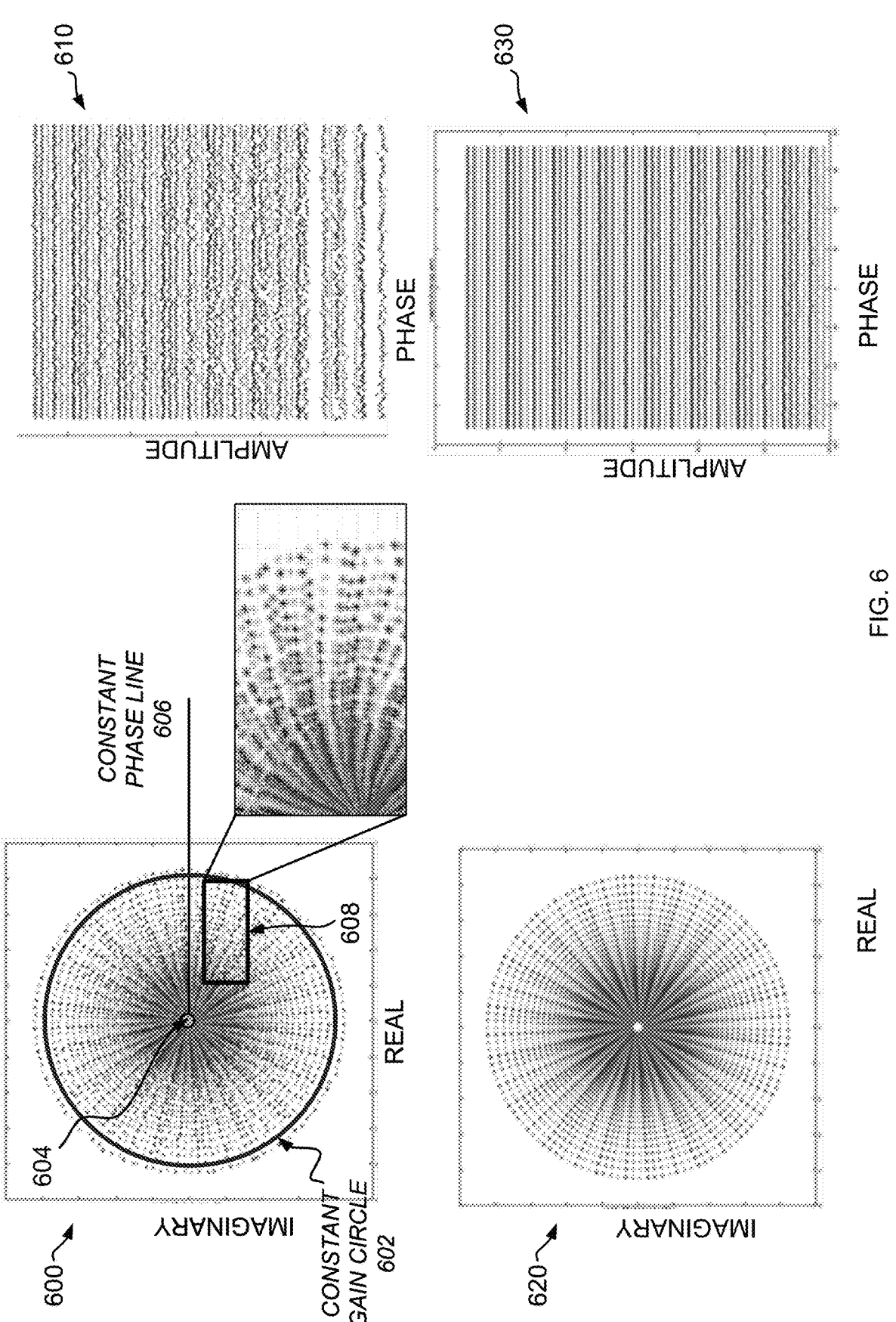
FIG. 6 illustrates plots of a calibration method, according to example embodiments of the present inventions and subject technology.

See FIG. 6, plot 600 within a constant gain circle 602. The lower amplitude levels may overlap, and therefore limiting the low amplitude values available. As illustrated in FIG. 6, a selected set 608 is shown in expanded view. A radius of the plot is one pair of <I,Q> values at different VGA state configurations, where RFIC design and manufacturing imperfections prevent the radius of being a straight line as ideally is expected. To simplify the W_LUT(phs',amp') selection some embodiments add the constraint that for all VGA values, the same set of 128<I,Q> combinations are used for all amp' states. The result is that there is a single set of <I,Q> to realize all desired phase shifts OD valid for all desired amplitudes $|A_D|$ states, and the amplitude is controlled only by the chosen VGA states.

FIG. 5 illustrates the steps of this process 500 with resulting plots. In a first state 502, the process collects cardinal <I,Q> states from the RFIC beamformer for specific amplitude and phase inputs; this is illustrated as plot 520. According to this process 500, IQ modulation uses multiple 8-bit DACs, as illustrated in FIG. 3. Extrapolation from the cardinal <I,Q> states results in an approximately rectangular shape, 504. Effectively this extrapolation produces the available complex vectors that the phase shifter is able to realize; this is illustrated as plot 522. In some embodiments, the process applies error correction modeling to the extrapolated <I,Q> pattern, 506, which introduced the inherent errors of the RFIC presented in plot 410 of FIG. 4. This is illustrated in plot 524. The extrapolated pattern 524 is then used to form a constant gain circle 516 from extrapolated data, 508, which is a cloud of <I,Q,VGA> points, plot 526. The circle 516 is optimized to a large size while avoiding edge cases that may not aid the calibration. An amplitude sweep is done for the constant gain circle for various combinations of amplitude and phase, 510; this is illustrated in plot 528. The amplitude sweeps are combined with constant gain circle, 512. The result in a combined gain circle 530 with amplitude sweeps.

FIG. 6 illustrates amplitude and phase shift in view of the I,Q state. In RFIC beamformer system 302 of FIG. 3, the phase shifting control is done in an I/Q rectangular system, the calibration process converts this to a circular set of points. The ideal output for an 8-bit DAC will give 256 points. To perform the mapping quickly with minimal measurement and computation and maintain a circular phase shifter output, the present methods reduce the number of data points using extrapolation. The calibration process determines the <I,Q> combination that will give you a circle, as the VGA is not linear, and the calibration chooses a voltage for amplitude or gain. FIG. 6 illustrates the way to increase processing speed by selection of a subset of points. As illustrated in plot 600, a constant gain circle 602 has a center 604 and each radial line is a constant phase line 606. From this large set of data points, selection of a subset of points selected properly enable quick accurate calibration.

The calibration is designed to find the combination <I,Q, VGA> resulting in <$\Phi_D$, |$A_D$|>. Selection of the optimum combination results to minimize testing time so as to reduce from testing of all combinations on all channels. In a system having two 8-bit DACs for phase, an 8-bit d for amplitude results in 224 (268,435,456) total test scenarios. The calibration methods disclosed herein provide methods for reducing the test scenarios used, such as the method of FIG. 5, where values are extrapolated to a cloud of useful <I,Q, VGA> points and then selecting those points, combinations, which yield the closest phase and amplitude results. <$I_S,Q_S$, VGA$_S$> resulting in approximately <$\Phi_D$, |$A_D$|>.

The present invention may be applied to a variety of systems for calibration of RF signals. In some embodiments, the system is a phased array antenna system, having an analog phase shifter module. The process described herein reduces the processing time, power and resources for calibration of antenna system.

As described herein an RFIC beamformer controls input variables for phase shifters and amplifiers to result in desired phase angle and amplitude outputs of transmission signals. In systems, such as a phased array antenna system, the RFIC beamformer operation is critical to proper performance. When the antenna elements are not well aligned there are transmission errors, and therefore, calibration is used to identify and compensate for the misalignment through RFIC beamformer control. The present invention provides smart calibration to reduce the control combinations of excitation voltages and currents of a RFIC beamformer required to adjust the phase shift and attenuation components. This calibration system and method employs IQ type of phase shifters and voltage gain adjustable attenuation controls.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A calibration method for a radio frequency integrated circuit (RFIC) beamformer module, comprising:
   receiving in phase and quadrature (I,Q) modulated signals from the RFIC beamformer module;
   identifying a set of cardinal states from the I, Q modulated signals;
   extrapolating data points in the set of cardinal states to a set of I, Q states;
   defining a constant gain circle within the set of I,Q states;
   extrapolating the constant gain circle to a set of concentric constant gain circles, each having a different constant amplitude that is less than an amplitude of the constant gain circle;
   determining a desired phase and a desired amplitude for a phased array antenna system using a phase controller module;
   selecting data points within the set of concentric constant gain circles to achieve the desired phase and the desired amplitude; and
   storing the data points in memory.

2. The method of claim 1, wherein the RFIC beamformer module is an analog component.

3. The method of claim 2, further comprising:
   measuring signals from channels of the RFIC.

4. The method of claim 1, further comprising:
   applying an error correction model to the set of I, Q states.

5. The method of claim 1, wherein the I, Q states are complex values.

6. The method as in claim 1, further comprising performing a method for evaluating the RFIC beamformer module performance involves evaluating behavior of gain and phase in isolation.

7. The method as in claim 1, further comprising performing an amplitude sweep for various combinations of the amplitude and phase for the constant gain circle.

8. The method as in claim 6, further comprising combining the amplitude sweep results with the constant gain circle.

9. The method as in claim 1, wherein the data points are a cloud of <I,Q,VGA> points, wherein the VGA is a variable gain amplifier.

10. The method as in claim 8, further comprising defining center and constant phase radial lines of the constant gain circle.

11. The method as in claim 9, further comprising reducing the cloud by selecting a subset of data points on a constant phase radial line within the constant gain circle.

12. The method as in claim 11, wherein the subset of data points identifies combinations of <I,Q, VGA> resulting in <$\Phi_D$, |$A_D$|> that reduce a number of channels to test and reduce a calibration time.

\* \* \* \* \*